J. C. SHOEMAKE.
CHECK ROW CORN PLANTER AND MARKER.
APPLICATION FILED OCT. 7, 1915.
1,167,438.
Patented Jan. 11, 1916.
2 SHEETS—SHEET 2.
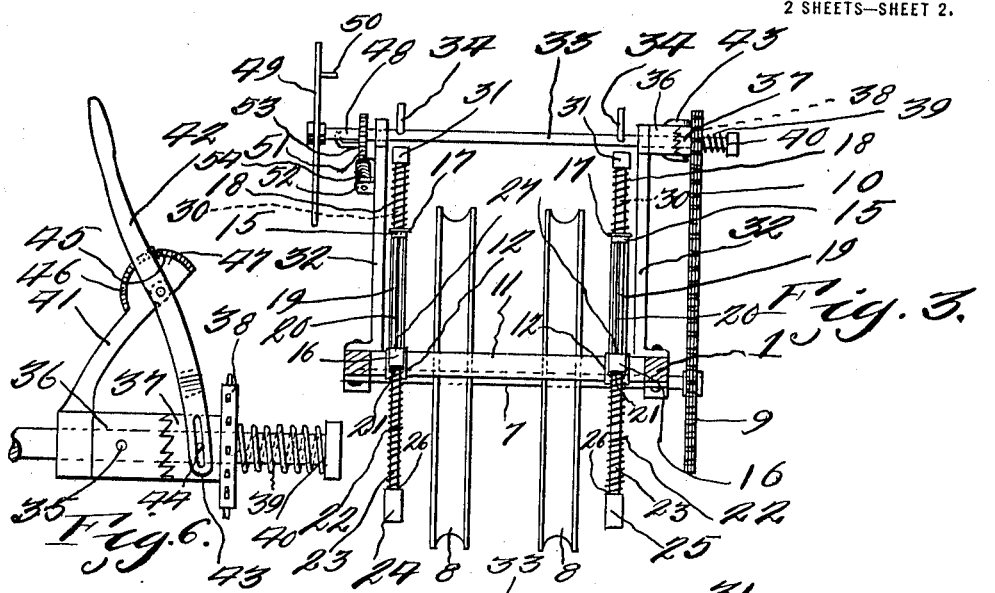
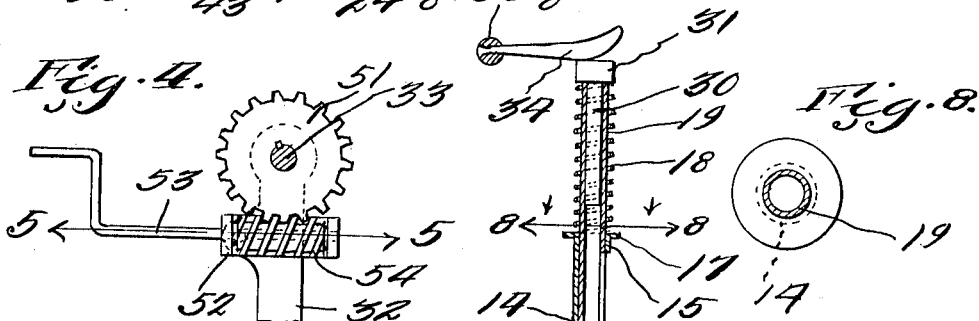
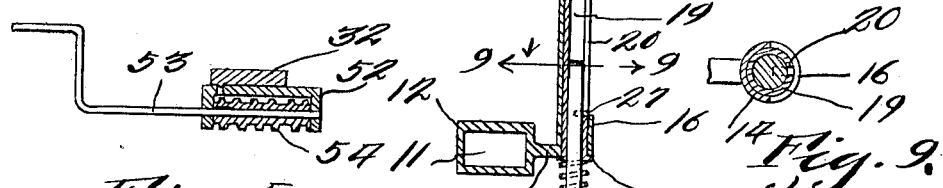
Witnesses
Inventor
John C. Shoemake
By D. Swift & Co.
Attorneys

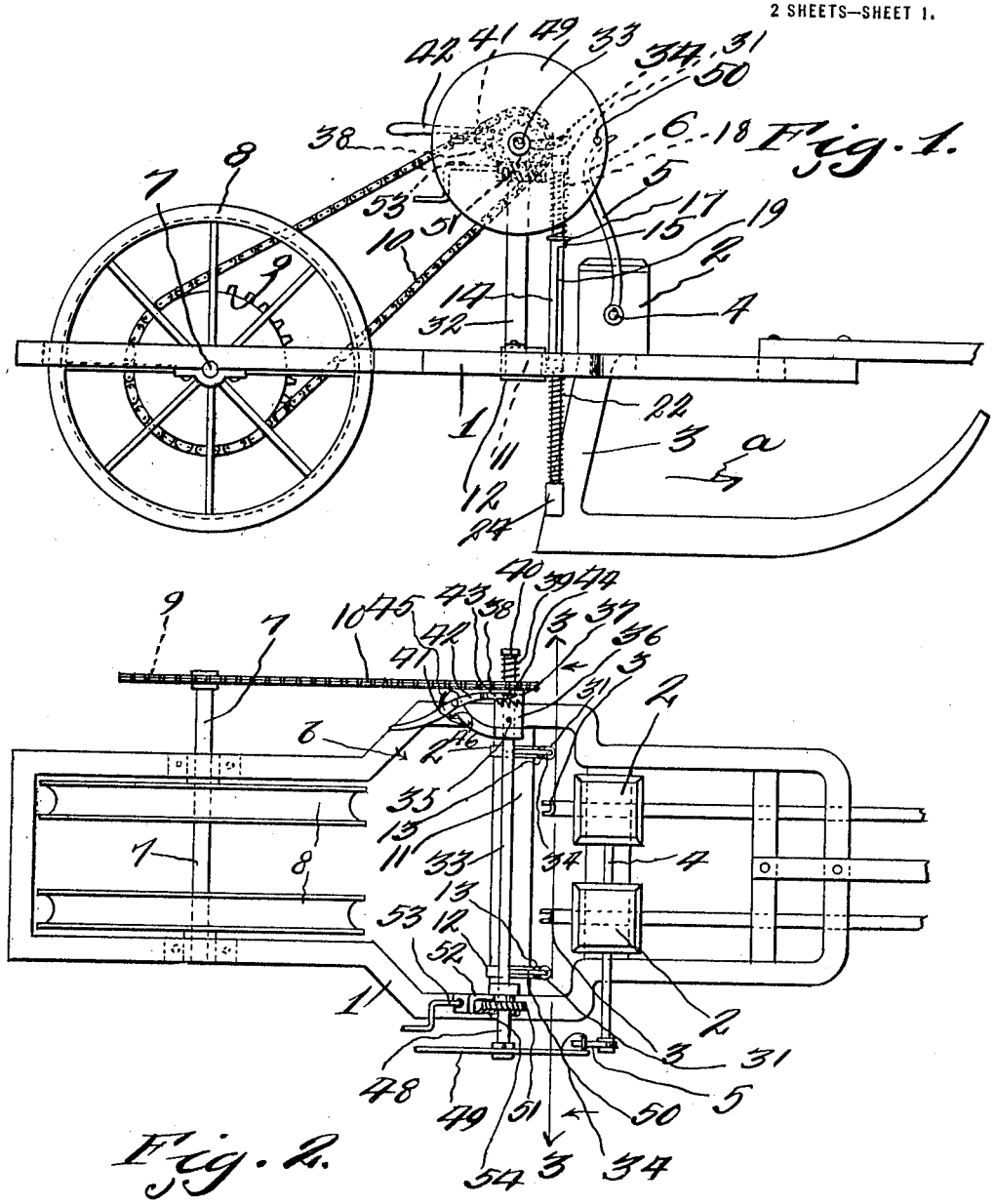

UNITED STATES PATENT OFFICE.

JOHN C. SHOEMAKE, OF HIRAM, MISSOURI.

CHECK-ROW CORN-PLANTER AND MARKER.

1,167,438.  Specification of Letters Patent.  Patented Jan. 11, 1916.

Application filed October 7, 1915. Serial No. 54,524.

*To all whom it may concern:*

Be it known that I, JOHN C. SHOEMAKE, a citizen of the United States, residing at Hiram, in the county of Wayne, State of Missouri, have invented a new and useful Check-Row Corn-Planter and Marker; and I do hereby declare the following to be a full, clear, and exact description of the invention, such as will enable others skilled in the art to which it appertains to make and use the same.

This invention relates to an improved check row corn planter and marker, and an object of the invention is to provide improved means for simultaneously operating the dropper devices and the markers, and which improved and practical means may be applied to any ordinary or conventional form of planter, so as to dispense with the chain or wire operated check devices.

Another object of the invention is to provide an improved marker, which is depressed against yieldable means, and is provided at its lower end with a yieldable marker proper, so as to yield, incident to coming in contact with an obstruction or the like.

Another object of the invention is to provide means to be actuated manually for setting the dropper devices and marker actuating means, so that after planning the first two rows of corn, each two successive rows will be planted even with the previously planted rows of corn.

In practical fields the details of construction may necessitate alterations, falling within the scope of what is claimed.

The invention comprises further features and combination of parts, as hereinafter set forth, shown in the drawings and claimed.

In the drawings: Figure 1 is a view in side elevation of a conventional or ordinary form of corn planting machine, showing the marking mechanism, and the means for actuating the dropper devices as applied thereto. Fig. 2 is a plan view. Fig. 3 is a sectional view on line 3—3 of Fig. 2. Fig. 4 is a detail view of the means for manually setting the marker actuating means. Fig. 5 is a sectional view on line 5—5 of Fig. 4. Fig. 6 is a detail plan view of the clutch mechanism for throwing the driving means out of gear with the mechanism for actuating the marker. Fig. 7 is a vertical sectional view through one of the markers. Fig. 8 is an enlarged detail sectional view on line 8—8 of Fig. 7. Fig. 9 is a sectional view on line 9—9 of Fig. 7.

Referring more especially to the drawings, 1 designates the frame of a conventional or ordinary form of corn planter comprising the seed hoppers or boxes 2, which are designed to carry the usual form of dropper devices (not shown), whereas 3 denotes the drills leading downwardly from the boxes or receptacles 2. A shaft 4 extends transversely through the seed boxes or receptacles 2 for actuating the dropper devices (not shown), in any suitable manner (not shown). Upon one end of the shaft 4 is an arm 5 having a cam portion 6. The frame has journaled in bearings thereof a drive shaft or axle 7 and the supporting wheels 8, and also journaled upon one end of the shaft 7 is a sprocket 9, about which a chain 10 travels.

Extending transversely of the frame 1 is a transverse bar 11, which receives the straps 12, which, as shown in Figs. 1, 2 and 7 are rectangular in form, to fit the rectangular contour of the bar 11. The straps 12 are provided with laterally extending arms 13, upwardly from which the standards 14 (which are semi-circular in cross section) rise. The upper and lower ends of both the standards are provided with annular collars 15 and 16. The upper collar 15 has an annular flange 17, which constitutes an abutment for the spring 18. Mounted in the standards 14 are tubes 19 having slots 20. These tubes also telescope through the collars, and the lower end of each tube is provided with an anular flange 21. The flanges 21 constitute abutments for the springs 22. Telescoping into the lower ends of the tube 19 are the shank portions 23 of the markers 24 and 25, and between the shoulders 26 of which markers and the flanges 21, the springs 22 are interposed. The shanks 23 are provided with pins 27, which extend laterally into the slots 20 of the tubes 19. The springs 22 constitute means to hold the markers 24 and 25 to their lowermost positions, with the pins 27 in the lower ends of the slots 20. It will be seen that in case the markers 24 and 25 come in contact with an obstruction, the markers will yield upwardly, the shanks 23 moving telescopically in the tubes 19, and the pins 27 moving upwardly in the slots 20. Secured frictionally in the upper ends of the tubes 19 are the shanks 30 of the heads 31, between which heads and the flanges 17 the springs 18 are interposed. Rising upwardly from the opposite sides of the frame 1 are oppositely disposed standards 32, in bearings of which a revoluble shaft 33 is mounted. This shaft 33 is provided with laterally extending camming arms 34, and when the shaft 33 is rotated, the arms 34 intermittently contact with the heads 31, thereby depressing the tubes 19, and owing to the springs 22 holding the pins 27 in the lower ends of the slots 20, the markers 24 and 25 will move toward the ground, and engage the ground, sufficiently to mark immediately opposite where the grain has been dropped and at the same time. In other words, as two rows of corn have been planted, a mark immediately opposite and upon the outside of each hill of corn will be made by the marker. After two rows of corn have been planted, the machine moving in the direction of the arrow $a$, the marker 25, after turning the machine to go back across the field, is placed in registration or alinement with the marks made by the marker 25. In further words, in turning the machine at the ends of two rows of corn, the machine practically pivots upon the marker 25, and after the second two rows of corn have been planted, and the machine has been turned to return across the field, the machine practically pivots upon the marker 24. In this manner the rows of corn are even and symmetrical at right angles to each other. Secured to the shaft 33 by means of a pin 35 is a clutch collar 36, with the teeth of which, the teeth of the movable clutch collar 37 coöperates. The collar 37 is carried by the sprocket 38 which is loosely journaled upon the shaft 33 at one end, and about which sprocket the chain travels. The spring 39 upon one end of the shaft 33 between the sprocket 38 and the shoulder 40 at one end of the shaft 33 constitutes means to hold the collar 37 in coöperation with the collar 36, so that when the machine is moving across the field, power is transmitted to the shaft 33 through the medium of the clutch connection and the chain 10, from the shaft or axle 7. Pivoted to the arm 41 forming an integral part of the upper end of one of the standards 32 is a lever 42 having a forked end 43 provided with slot and pin connections 44 with the collar 37, so that when the lever is moved in the direction of the arrow $b$ the teeth of the collar 37 are disengaged from the teeth of the collar 36, thereby throwing the shaft out of gear with the chain drive 10. When the lever 42 is moved in this manner, a flange 45 adjacent the handle end of the lever engages the teeth 46 of the plate 47 on one side of the frame, to hold the lever in the position to which it has been moved.

Upon the end 48 of the shaft 33 is a disk 49 provided with a laterally extending lug or pin 50.

When the shaft 33 is revolved or rotated the arms 34 contact with the heads 31, thereby depressing the marker, and owing to the pin or lug 50 being in a line radially with the arms 34, as shown in side elevation in Fig. 1, the pin 50 cams against the cam portions 6, thereby actuating the arm 5, which in turn, as previously stated actuates the shaft 4, to actuate the dropper devices (not shown) in any suitable manner (not shown), which dropper devices are carried in the grain boxes or receptacles 2. Therefore as the hills of corn are planted, an indication or mark is made opposite the hills. Also carried adjacent the end 48 of the shaft 43 is a worm wheel 51, and pivoted to the outside of one of the standards 32 is a bracket 52, in the arms of which a crank shaft 53 is journaled. This crank shaft 53 is provided with a worm 54. The bracket 52 is so pivoted with relation to the worm wheel, that it may be tilted, so as to bring the worm in mesh with the worm wheel. However, this is only accomplished after turning the planter at the end of two rows of corn, so that while the clutch collars are out of gear, the shaft 33 may be manually rotated partially, in order to set the arms 34 and the pin 50, in such positions as to actuate the markers and the dropper devices at the proper time, so that the hills of corn and their adjacent marks will be even to the previous hills and marks.

The invention having been set forth, what is claimed as new and useful is:—

1. In combination with a corn planter having a frame and supporting wheels and provided with dropper devices, a marker mechanism comprising guide standards mounted on said frame, tubular members mounted in said guide standards having heads at their upper ends and provided with yieldable means between the head and the upper ends of the guide standards, markers having shanks telescoping into the tubular members and having slot and pin limiting connections with the tubular members, springs upon said shanks between the markers and the lower ends of the tubular members, and means having connections with the supporting wheels for intermittently actuating said tubular members.

2. In combination with a corn planter having a frame and supporting wheels and provided with dropper devices, a marker mechanism comprising guide standards mounted on said frame, tubular members mounted in said guide standards having heads at their upper ends and provided with yieldable means between the head and the upper end of the guide standards, markers having shanks telescoping into the tubular members and having slot and pin limiting connections with the tubular members, springs upon said shanks between the markers and the lower ends of the tubular members, and means having connections with the supporting wheels for intermittently actuating said tubular members, said means having operating connections with the dropper devices of the seed receptacles of the planter, for actuating the dropper devices at the same time the markers are actuated.

3. In combination with a corn planter having a frame and supporting wheels and provided with dropper devices, a marker mechanism comprising guide standards mounted on said frame, tubular members mounted in said guide standards having heads at their upper ends and provided with yieldable means between the head and the upper end of the guide standards, markers having shanks telescoping into the tubular members and having slot and pin limiting connections with the tubular members, springs upon said shanks between the marks and the lower ends of the tubular members, and means having connections with the supporting wheels for intermittently actuating said members, said means having operating connections with the dropper devices of the seed receptacles of the planter, for actuating the dropper devices at the same time the markers are actuated, said means having a clutch mechanism to throw the means out of gear with said supporting wheels, said means including a revoluble shaft, and a device having connections with said shaft for manually rotating the same partially to set said means and the means of connection with the dropper devices.

In testimony whereof I have signed my name to this specification in the presence of two subscribing witnesses.

JOHN C. SHOEMAKE.

Witnesses:
JAMES L. SHOEMAKE,
JOHN A. HEATH.

Copies of this patent may be obtained for five cents each, by addressing the "Commissioner of Patents, Washington, D. C."